(12) United States Patent
Bruening et al.

(10) Patent No.: US 6,623,644 B2
(45) Date of Patent: Sep. 23, 2003

(54) POLYAMIDE LIGAND-CONTAINING POLYMERIC RESINS AND METHODS OF USING THE SAME FOR REMOVING, SEPARATING AND/OR CONCENTRATING DESIRED METAL IONS FROM SOLUTIONS

(75) Inventors: Ronald L. Bruening, American Fork, UT (US); Krzysztof E. Krakowiak, Provo, UT (US)

(73) Assignee: IBC Advanced Techologies, Inc., American Fork, UT (US)

( * ) Notice: Subject to any disclaimer, the term of this patent is extended or adjusted under 35 U.S.C. 154(b) by 1 day.

(21) Appl. No.: 09/966,214

(22) Filed: Sep. 27, 2001

(65) Prior Publication Data

US 2002/0042495 A1 Apr. 11, 2002

Related U.S. Application Data

(62) Division of application No. 09/444,114, filed on Nov. 22, 1999, now Pat. No. 6,335,420.

(51) Int. Cl.$^7$ .......................... B01D 61/00; B01D 63/02; B01D 15/08
(52) U.S. Cl. ....................... 210/660; 210/649; 210/650; 210/651; 210/661
(58) Field of Search ................................ 210/660, 649, 210/650, 651, 661

(56) References Cited

U.S. PATENT DOCUMENTS 5,656,702 A  8/1997  Tarbet et al. ................ 525/480

OTHER PUBLICATIONS

J.M. Grana–Molares, C. Baluja–Santos, A. Alvarez–Devesa, et F. Bermejo–Martinez; Étude spectrophotométrique des complexes du cobalt (III) avec les amides de l'EDTA et du DTPA, analysis, vol. 7, pp. 249–252 (1979).

Lech Przyborowski; Complex Compounds of Amides and Thiolamides of Aminopolycarboxylic Acids. Part III *. Synthesis, Properties and Copper (II) Complexes of Nitrilotriacetotriamide and Ethylenediaminetetraacetotetraamide, vol. 44, pp. 1883–1893 (1970).

Ritu Kataky, Karen E. Matthes, Patrick E. Nicholson, and David Parker; Synthesis and Binding Properties of Amide–functionalised Polyaza Macrocycles, Journal of the Chemical Society, Perkin Transactions 2, pp. 1425–1432 (1990).

Hulisani Maumela, Robert D. Hancock, Laurence Carlton, Joseph H. Reibenspies, and Kevin P. Wainwright; The Amide Oxygen as a Donor Group, Metal Ioln Complexing Properties of Tetra–N–acetamide Substituted Cyclen: A Crystallographic, NMR, Molecular Mechanics, and Thermodynamic Study, Journal of the American Chemical Society, vol. 117, pp. 6698–6707 (1995).

*Primary Examiner*—Ana Woodward
(74) *Attorney, Agent, or Firm*—Thorpe North & Western, LLP

(57) ABSTRACT

The present invention is drawn to polyamide ligand-containing polymeric resins and methods of using the same for removing, separating, and/or concentrating certain desired metal ions from solutions, even when the desired ions are in the presence of other metal ions and/or hydrogen ions at much higher concentrations. The unique composition of matter of this invention is a polyamide ligand-containing polymeric resin which is a reaction product of a hydroxymethylated polyamide ligand and a polymerization and/or crosslinking agent. Specifically, the polymeric resins of the present invention are comprised of from 10 to 50,000 polyamide ligand units wherein each polyamide ligand unit contains at least three amide groups (preferably from three to eight amide groups) and two amine groups separated by at least two carbons. Each amide group, after polymerization, may remain hydroxymethylated or be crosslinked to other polyamide ligand units through a crosslinking agent.

21 Claims, No Drawings

POLYAMIDE LIGAND-CONTAINING POLYMERIC RESINS AND METHODS OF USING THE SAME FOR REMOVING, SEPARATING AND/OR CONCENTRATING DESIRED METAL IONS FROM SOLUTIONS

PRIOR APPLICATION

This is a division of application Ser. No. 09/444,114 filed Nov. 22, 1999 now U.S. Pat. No. 6,335,420.

FIELD OF THE INVENTION

The present invention relates to polyamide ligand-containing polymeric resins which are polymerized and/or crosslinked and methods of using the same for removing, separating, and/or concentrating certain desired metal ions from solutions, even when the desired ions are in the presence of other metal ions and/or hydrogen ions at much higher concentrations.

BACKGROUND OF THE INVENTION

Effective methods for the separation and recovery of particular ions such as the transition, post-transition, and alkaline earth metal ions from solution mixtures containing these and other metal ions are of great importance in modern technology. Particularly, it is difficult to separate and recover certain metal ions such as $Cd^{2+}$, $Pb^{2+}$, $Ag^+$, $Ni^{2+}$, $Co^{2+}$, $Fe^{3+}$, $Cu^{2+}$, $Sr^{2+}$, and/or $Ca^{2+}$ from the presence of even moderate amounts of hydrogen ion ($H^+$). It is also very difficult to remove these desired metal ions when present at low concentrations in solutions that contain other, non-desired metal ions at much greater concentrations. Thus, there is a real need for a composition of matter and an associated method that may be used for selectively separating certain transition, post-transition, and alkaline earth metal ions from other non-desirable ions.

It is known that ethylenediaminetetraacetamide (EDTAA), diethylenetriaminepentaacetamide (DTPAA), and nitrilotriacetamide (NTAA) form strong complexes with various metal ions in solution. These molecules may be shown as Formulas 1–3 respectively below:

Formula 1

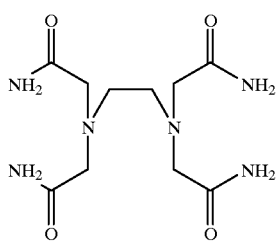

EDTAA

Formula 2

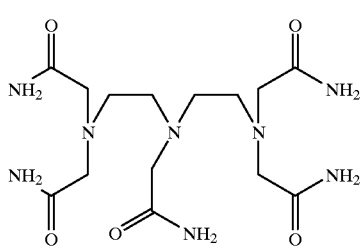

DTPAA

Formula 3

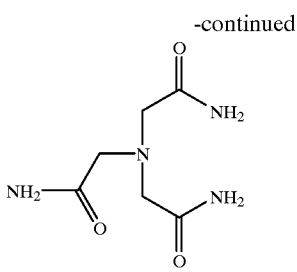

NTAA

J. M. Grana-Molares, C. Baluja-Santos, A. Alvarez-Devesa and F. Bermejo-Martinez, *Etude Spectrophotometrigue des Complexes du Cobalt(III) avec les Amides de l'EDTA et du DTPA,* Analysis, Volume 7, 249–252 (1979) reported on the synthesis of EDTAA and DTPAA and their ability to complex Co(III) as shown by a spectrophotometric technique. In a different study, L. Przyborowski, *Complex Compounds of Amides and Thioamides of Aminopolycarboxylic Acids, Part III. Synthesis, Properties and Copper(II) Complexes of Nitrilotriacetotriamide and Ethylenediaminetetraacetotetraamide,* Roczniki Chemii, Volume 44, 1883–1893 (1970) showed that NTAA and EDTAA could be prepared by modifying known methods and that Cu(II) formed strong complexes with NTAA.

More recently, a great deal of research has been done in the synthesis and metal ion complexation properties of polyamide-containing azacrown ethers such as those containing acetamide, propionamide, and peptide side arms. R. Kataky, K. E. Matthes, P. E. Nicholson, D. Parker and H-J. Buschmann, *Synthesis and Binding Properties of Amide-Functionalized Polyazamacrocycles,* Journal of the Chemical Society, Perkin Transactions 2, 1425–1432 (1990) reported on the synthesis and complexation properties of per-N-(dimethylacetamido)-substituted triaza-9-crown-3, aza-12-crown-4, diaza-12-crown-4, and tetraaza-12-crown-4. The ligating agents 1,4,7,10-tetrakis (N,N-dimethylacetamido)-1,4,7,10-tetraazacyclododecane and 1,7-dioxo-4,10-bis(N,N-dimethylacetamido)-4,10-diazacyclododecane are two chemical structures that were synthesized and which are representative of polyamide-containing ligating agents of the present invention. These ligating agents are shown respectively below in Formulas 4 and 5:

Formula 4

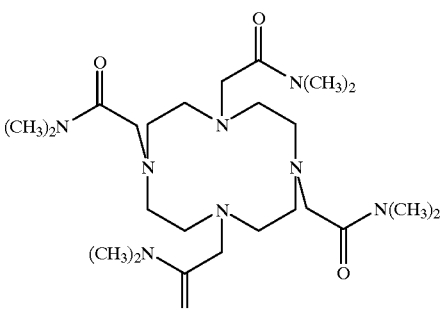

Tetraazacyclododecane

-continued

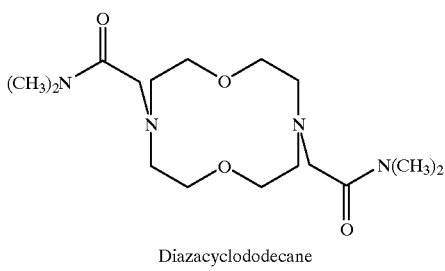

Formula 5

Diazacyclododecane

The diamide of Formula 5 was shown to form complexes with all of the alkali metal and alkaline earth metal cations. Further, this diamide was shown to have significant selectivity for $Ca^{2+}$ over the other cations studied. However, a diamide similar to that of Formula 5, but containing one more methylene group in each amide-containing arm (thus, having two N,N-dimethylpropioamido substituents), was shown to form weaker complexes with these same metal ions.

Further studies of amide ligands, such as those depicted by formulas 4 and 5, have concluded that the size of the metal ion-ligand chelate ring determines the strength of the interaction between the ligand and the metal ions. For example, a five-membered ring favored the smaller cations over a six-membered ring. Representative of fully chelated metals (Me) having five- and six-membered amide rings attached are shown in Formulas 6 and 7 respectively below:

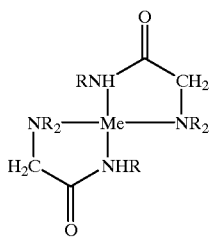

Formula 6

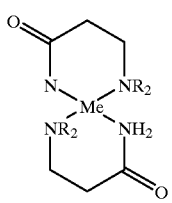

Formula 7

H. Maumela, R. D. Hancock, L. Carlton, and J. H. Reibenspies and K. P. Wainwright, *The Amide Oxygen as a Donor Group. Metal Ion Complexing Properties of Tetra-N-Acetamide Substituted Cyclen: A Crystallographic, NMR, Molecular Mechanics and Thermodynamic Study*, Journal of the American Chemical Society, Volume 117, 6698–707 (1995), reported the synthesis of 1,4,7,10-tetraazacyclododecane (DOTAM) which is the unsubstituted amide analogue of the tetraamide of Formula 4. DOTAM is capable of forming complexes with a host of metal ions including many transition and post-transition metal ions. DOTAM also forms strong complexes with $Cd^{2+}$ and $Pb^{2+}$, even at pH levels of as low as 0.3 which is equivalent to a hydrogen ion concentration of 0.5 Molar. DOTAM may be represented by Formula 8 below:

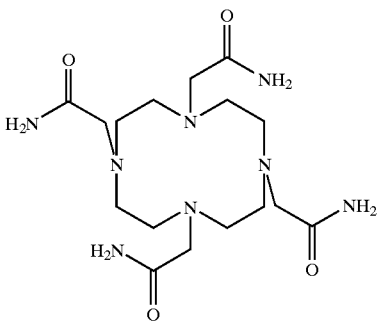

Formula 8

DOTAM

The articles cited above disclose procedures for synthesizing and demonstrating limited useful complexation properties of polyamide-containing ligand molecules. However, researchers have not previously been able to incorporate polyamide-containing ligands into solid phase separation systems. This is significant because these polyamide-containing ligands merely act as a solute in solution by complexing with selected ions, but provide no effective means for ion separation.

The use of polymeric resins for selective removal of ions is not a new concept of itself. In U.S. Pat. No. 5,656,702, the use of poly(hydroxyarylene) polymeric resins is disclosed for removing alkali metals, particularly cesium, from industrial streams. However, never before have polyamide ligand-containing polymeric resins been successfully synthesized that can be used in a solid phase separation system to concentrate and remove desired metal ions such as members selected from the group consisting of $Cd^{2+}$, $Pb^{2+}$, $Ag^+$, $Ni^{2+}$, $Co^{2+}$, $Fe^{3+}$, $Cu^{2+}$, $Sr^{2+}$, an $Ca^{2+}$ from source solutions.

SUMMARY OF THE INVENTION

The present invention is drawn to polyamide ligand-containing polymeric resins and methods of using the same for removing, separating, and/or concentrating certain desired divalent metal ions including transition, post-transition, and alkaline earth metal ions from source solutions. The unique composition of matter of this invention is a polyamide ligand-containing polymeric resin which has been polymerized and/or crosslinked. These resins are generally a reaction product of a hydroxymethylated polyamide ligand and a polymerization and/or crosslinking agent. Specifically, the polymeric resins of the present invention are comprised of from 10 to 50,000 polyamide ligand units wherein each polyamide ligand unit is defined by three or more amide groups, preferably from three to eight amide groups, and two or more amine nitrogen donor atoms separated by at least two carbons.

The present invention is particularly useful for the removing of ions selected from the group consisting of $Cd^{2+}$, $Pb^{2+}$, $Ag^+$, $Ni^{2+}$, $Co^{2+}$, $Fe^{3+}$, $Cu^{2+}$, $Sr^{2+}$, $Ca^{2+}$, and combinations thereof from source solutions. This is true whether the desired ions are present at very low or very high concentrations, i.e., from ppb to g/l.

The concentration of desired ions is accomplished by forming a complex of desired ions with the polyamide ligand-containing polymeric resins by flowing a source solution containing the desired ions through a column packed with the polymeric resin beads or granules. The metal ion and the polyamide ligand-containing polymeric resins are then decoupled by flowing a receiving liquid through the column (in much smaller volume than the volume of source solution passed through the column) to removing, separating, and/or concentrating the desired ions in the receiving liquid solution. The receiving liquid or recovery solution forms a stronger complex with the desired ions than does the polyamide ligand-containing polymeric resins, or alternatively, temporarily forms a stronger interaction with the polyamide ligand-containing polymeric resins than does the desired metal ions. In either case, the desired metal ions are quantitatively stripped from the polyamide ligand-containing polymeric resins in a concentrated form in the receiving solution. The recovery of desired ions from the receiving liquid may be accomplished by various methods commonly known in the art including evaporation, electrowinning, and precipitation among others.

DETAILED DESCRIPTION OF THE INVENTION

The polyamide ligand-containing polymeric resins of the present invention are a reaction product of a polyamide ligand and formaldehyde or other suitable compound capable of forming a hydroxymethylated polyamide ligand. The hydroxymethylated polyamide ligand is then polymerized using a polymerization and/or crosslinking agent to form the polyamide ligand-containing polymeric resins. The polyamide ligand-containing polymeric resins of the present invention are comprised of from 10 to 50,000 polyamide ligand units wherein each polyamide ligand unit or monomer is defined by three or more amide groups, preferably from three to eight amide groups, as well as two or more amine nitrogen donor atoms separated by at least two carbons. Each amide group of the polyamide ligand unit, after hydroxymethylation, may remain hydroxymethylated or be polymerized and/or crosslinked to other polyamide ligand units through a polymerization agent or a crosslinking agent. At least one of the amide groups of the resin must be polymerized or crosslinked, preferably from two to eight.

The structure of the present invention may be represented generally by Formula 9 as follows:

$(LX_m)_n$   Formula 9 wherein L represents the polyamide-containing ligand having three or more amide groups, preferably from three to eight amide groups, and two or more amine nitrogens separated by at least two carbons, n may be an integer from about 10 to 50,000, m is at least three, preferably from three to eight, and X may be $CH_2OH$, $CH_2O-$, $CH_2-$, a crosslinking agent, or a resulting group from polymerization with the proviso that each X group is bonded individually to L and at least one X group per polyamide ligand unit is involved in the polymerization or crosslinking.

Amide groups of the ligand which remain hydroxymethylated after polymerization are free to bind with the desired metal ions according to the present invention. However, the amide groups of the ligand which are involved in the polymerization reaction or crosslinking may also be involved in the binding of the desired metal ions. In other words, it is not the purpose of the invention to describe specifically how each of the polymeric resins complex with each specific desired ion, only that the polymeric resins described herein will bind with the desired ions also described herein.

It is to be noted that the crosslinking agents or polymerization agents that may be used and the processes of crosslinking and/or polymerization are known in the art. For example, phenols, resorcinol, fluoroglucinol, aromatic or aliphatic amines, pyrroles, indoles, nitrates, esters, ketones, and nitriles, and/or other known crosslinking agents may be used. Further, polymerization agents that may be used include bisaldehydes, polyaldehydes, dihalogens, polyhalogens, dihalogens of diacids, polyhalogens of polyacids, diesters, polyesters, anhydrides of acids, diepoxides, polyepoxides, and/or other known polymerization agents.

In one preferred embodiment, a hydroxymethylated polyamide ligand may be polymerized linearly using a polymerization agent. In a second preferred embodiment, the generally linear polymer described above may be crosslinked using a crosslinking agent. In another preferred embodiment, a hydroxymethylated polyamide ligand may be both polymerized and crosslinked using only a single polymerization/crosslinking agent. As such, one skilled in the art may utilize these known polymerization agents and crosslinking agents in any functional combination and not depart from the scope of the present invention.

Representative examples of polyamide ligands (L) that may be hydroxymethylated and then polymerized to form polyamide ligand-containing polymeric resins that have at least three amide groups and two or more amine nitrogens separated by at least two carbons include: ethylenebis (oxyethylenenitrilo) tetraacetic acid (EGTAM), diaza-18-crown-6-tetraamide, ethylenediaminetetraacetamide-N-methylenepropanetetraamine (EDTAAMT), tris(2-aminoethyl)amine pentaamide (TRENPAM), and diethylenetriaminepentaacetamide (DTPAM). This list is intended only to be representative of the possible ligands that may be used, the limiting factor being the presence of at least three amide groups, preferably from three to eight amide groups, and at least two amine nitrogens separated by two or more carbons. Further variations of these ligands may also be used. For example, tris(2-aminoethyl)amine pentaamide (TRENPAM) may be alkyl or aryl substituted. Once polymerized, the polyamide-ligand units of the present invention form beads and/or granules which may be used for ion removal, separation, and/or concentration.

As summarized above, the present invention is drawn to a novel composition of matter comprising polyamide ligand-containing polymeric resins. The present invention is also Undrawn to methods for the preferential removal, separation, and/or concentration of certain desired metal ions, such as certain transition, post-transition, and alkaline earth metal ions from solution. The solution from which the desired ions may be removed may contain other metal ions or hydrogen ions present at greater concentrations than the desired ions. For example, $Cd^{2+}$, $Pb^{2+}$, and $Ag^+$ may be removed from acidic and or highly chelative matrices and $Ni^{2+}$, $Co^{2+}$, $Fe^{3+}$, $Cu^{2+}$, $Sr^{2+}$, and $Ca^{2+}$ may be removed from slightly acidic to neutral pH matrices and from chelating matrices. Moreover, the above described polyamide ligand-containing polymeric resins provide a mechanism for separating ppb to ppm levels of $Cd^{2+}$ and $Pb^{2+}$ from concentrated acid solution by using separation techniques and equipment generally known in the art.

The method for separating and recovering desired ions is accomplished by forming a complex of the desired ions with polyamide ligand-containing polymeric resins. Specifically, this is accomplished by flowing a source solution containing the desired ion(s) through a packed column or other known device with these polymeric resin beads or granules in order to complex or chelate the desired metal ion(s) to one or more polyamide ligand units of the polyamide ligand-containing polymeric resins. Subsequently, the desired cation which is bound to the polyamide ligand-containing polymeric resins is released by flowing a complex-breaking receiving liquid in much smaller volume than the volume of source solution originally passed through the column or other known device. This removes, separates and/or concentrates the desired ions in the receiving liquid solution by either (a) forming a stronger complex with the desired transition, post-transition, or alkaline earth metal ion(s) than do the polymeric resins, or (b) temporarily forming a stronger interaction with the polymeric resins than do the desired metal ion(s), and thus, the desired metal ion(s) are quantitatively stripped from the polyamide ligand-containing polymeric resins in concentrated form in the receiving solution. The recovery of desired metal ion(s) from the receiving liquid is accomplished by evaporation, electrowinning, precipitation or by other known methods.

EXAMPLES

The following examples should not be considered as limitations of the present invention, but are merely intended to teach how to make the polyamide ligand-containing polymeric resins based upon current experimental data.

Example 1

Synthesis of Ethylenediaminetetraacetamide (EDTAM) and Polymerization Forming a Polymeric Resin

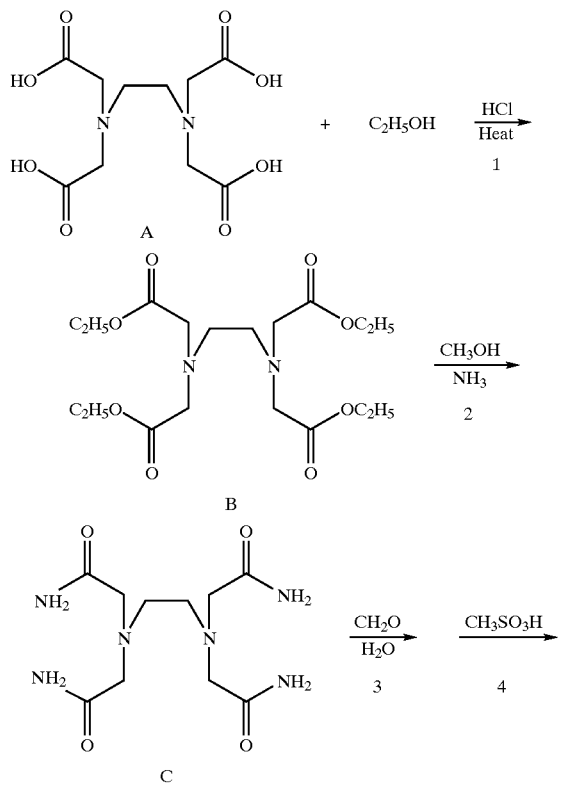

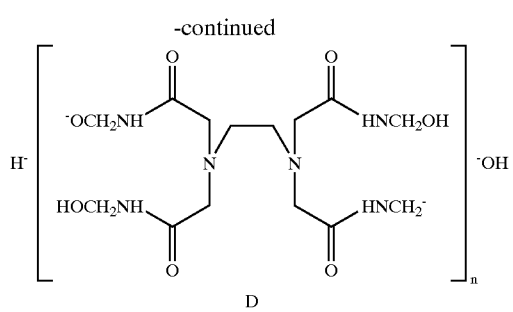

Step 1—About 140 g (0.48 mole) of ethylenediaminetetraacetic acid (EDTA) (A) and 600 mL of ethyl alcohol were placed in a flask equipped with a Soxhlet extraction apparatus and refluxed while HCl gas was continuously bubbled through the system. After the mixture became homogeneous, it was refluxed for another 5 hours. The ethanol was then removed by evaporation. A 10% sodium carbonate aqueous solution was added to adjust the pH of the solution to about 8. The solution was then extracted with diethyl ether. The diethyl ether organic layer was separated, dried by adding sodium sulfate and concentrated under reduced pressure. About 153 g (79% of theoretical) of the tetraester (B) was obtained after purification by column chromatography (silica, ethyl acetate). Purity was determined by NMR giving the following values: $^1$H NMR (300 MHz, DCCl$_3$, [deuteriochloroform]) δ4.2 (q, 8H), 3.6 (s, 8H), 2.9 (s4H), 1.3 (t, 12H); FABMS 404 (M$^+$)

Step 2—About 10 g (25 mmole) of tetraester (B) was dissolved in 30 mL of methyl alcohol and combined with 200 mL of 7N ammonia solution in methyl alcohol. The mixture was stirred for 5 days at room temperature. A white precipitate formed that was filtered and washed with methyl alcohol. The precipitate was then dried in a vacuum oven. About 5 g of EDTAA (C) was formed.

Step 3—About 5 g of EDTAA (C), was dissolved in 100 mL of water and combined with a solution containing 2 g of paraformaldehyde in 8 mL of water. The system was stirred at room temperature for 3 hours. The water was then evaporated and the hydroxymethylated tetraacetamide residue was dried under a vacuum using phosphorous pentaoxide.

Step 4—About 2 g of the hydroxymethylated tetraacetamide obtained in Step 3 was treated with 10 mL of methanesulfonic acid at room temperature for 2 hours. A polymeric mass (D) was formed which was filtered, washed with water and dried under a vacuum at 50° C. using phosphorous pentaoxide. About 2 g of the EDTAM polymeric resin (D) was obtained.

The EDTAM polymeric resin structure (D) illustrates an essentially linear polymeric resin. However, this structure may be further polymerized or crosslinked using additional amounts of the polymerization agent, an additional polymerization agent, or a crosslinking agent. The structure of such a crosslinked resin structure would be difficult to ascertain as it would depend on the crosslinking agent, the number of amide groups entering into the crosslinking reaction, the degree of polymerization, and other variables known by those skilled in the art.

Example 2

Synthesis of Diethylenetriaminepentaacetamide (DTPAM) and Polymerization Forming a Crosslinked Polymeric Resin

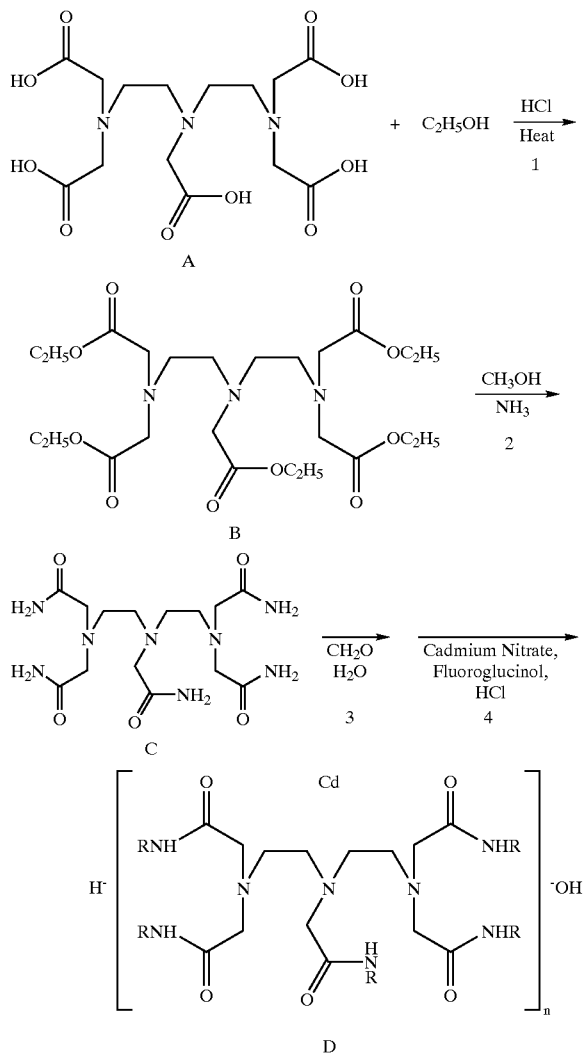

Step 1—About 189 g (0.48 moles) of tris(2-aminoethyl) pentaacetic acid (A) and 1000 mL of ethyl alcohol were placed in a flask equipped with a Soxhlet extraction apparatus and refluxed while HCl gas was continuously bubbled through the system. After the mixture became homogeneous, it was refluxed for another 7 hours. The ethanol was then removed by evaporation. A 10% sodium carbonate aqueous solution was added to adjust the pH of the solution to about 8. The solution was then extracted with diethyl ether. The diethyl ether organic layer was separated, dried by adding sodium sulfate and concentrated under reduced pressure. About 192 g (75% of theoretical) of the pentaester (B), was obtained after purification by column chromatography (silica, ethyl acetate).

Purity was determined by NMR giving the following values: $^1$H NMR (300 MHz, DCCl$_3$, [deuteriochloroform]) $\delta$4.2 (q, 10H), 3.6 (mm, 10H), 3.2 (m, 4H), 3.0 (m, 4H), 1.3 (t, 15H), FABMS 537 (M$^+$).

Step 2—About 13 g (25 mmole) of the pentaester (B) was dissolved in 40 mL of methyl alcohol and combined with 200 mL of 7N ammonia solution in methyl alcohol. The mixture was stirred for 6 days at room temperature. A white precipitate formed that was filtered and washed with methyl alcohol. The precipitate was then dried in a vacuum oven. About 6 g of DTPAA (C) was formed.

Step 3—The hydroxymethylated pentaacetamide derivative of DTPAA was prepared by dissolving DTPAA (C) in water and combining with an aqueous solution of paraformaldehyde. The system was stirred for 3 hours at room temperature.

Step 4—About 3 g (5.7 mmole) of cadmium nitrate tetrahydrate was dissolved in 50 mL of water and added to the hydroxymethylated compound solution of Step 3. A cadmium complex was allowed to form by stirring the complex for 20 minutes at room temperature. The complex was used as a template for polymerization. About 1.5 g of fluoroglucinol in 20 mL of ethyl alcohol and 2 mL of concentrated hydrochloric acid were added to the solution. The solution was kept at a temperature of 60° C. for 3 hours then stirred at room temperature overnight. A polymeric resin (D) formed which was filtered, washed with water then methanol and dried under a vacuum at 50° C. using phosphorous pentaoxide. About 4.1 g of the DTPAM polymeric resin (D) was obtained.

In the present example, paraformaldehyde is used to prepare the hydroxymethylated pentaacetamide derivative of DTPAA. If used in excess, the paraformaldehyde may initiate some polymerization. However, in the present example, the bulk of the polymerization and/or crosslinking is a result of the addition of the fluoroglucinol. Therefore, in Formula D of this example, R may represents either a hydroxymethyl group, i.e., CH$_2$OH, a resulting group from any polymerization that occurs, or the following crosslinking agent which is a derived from fluoroglucinol:

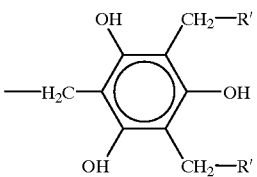

where R' is either an —OH group or another polyamide ligand unit on the polymer itself, i.e., crosslinking. If both of the R' variables are —OH, then there is no crosslinking. Therefore, it is preferably that at least one R' group is involved in crosslinking, i.e., not an —OH group. Further, at least one of the R groups of Formula D must be involved in the polymerization or crosslinking, preferably from two to five.

Example 3

Separations Using the DTPAM Polymeric Resin of Example 2

In this example, 0.1 g of the DTPAM polymer of Example 2 was placed in a packed column. A 75 mL source solution containing 2 ppm (parts per million) of Sr$^{2+}$ in 0.05 M KCl, 0.1 M sodium acetate, and 0.01 M acetic acid was passed through the column. About 2 mL of water was then passed through the column to wash out the remaining loading solution. Next, the Sr$^{2+}$ was eluted with 1 mL of 0.5 M H$_2$SO$_4$. Analysis of the above solutions by Atomic Adsorption Spectroscopy (AA) showed that greater than 99% of the Sr$^{2+}$ originally present in the source solution. described above was separated into the 1 mL receiving solution. Furthermore, the K$^+$ and Na$^+$ levels in the receiving liquid were less than 1 ppm.

We claim:

1. A method for removing, separating, or concentrating selected ions from a source solution comprising the steps of:
   (a) contacting said source solution with a polyamide ligand-containing polymeric resin which is a reaction product of a hydroxymethylated polyamide ligand and one or more agents selected from the group consisting of polymerization agents, and crosslinking agents, said polymeric resin being comprised of from 10 to 50,000 polyamide ligand units, and wherein said polymeric resin has an affinity for said selected ions such as to form a complex between said selected ions and said polymeric resin;
   (b) removing the source solution from contact with said polymeric resin to which said selected ions have been complexed; and
   (c) contacting said polymeric resin having said selected ions complexed thereto with a smaller volume of an aqueous receiving solution in which said selected ions are either soluble, or which has greater affinity for such selected ions than does the polymeric resin, thereby quantitatively stripping such selected ions from the ligand and recovering said selected ions in concentrated form in said receiving solution.

2. A method according to claim 1 wherein each of said polyamide ligand units has three or more amide groups and two or more amine nitrogens separated by at least two carbons.

3. A method according to claim 2 wherein each of said polyamide ligand units has from three to eight amide groups.

4. A method according to claim 3 wherein at least one amide group of said polyamide ligand unit is polymerized or crosslinked to another polyamide ligand unit by a polymerization agent or a crosslinking agent.

5. A method according to claim 4 wherein from two to eight amide groups of said polyamide ligand unit are polymerized or crosslinked to one or more polyamide ligand unit by a polymerization agent or a crosslinking agent.

6. A method according to claim 4 wherein said polymerization agent is selected from the group consisting of polyaldehydes, polyhalogens, polyhalogens of polyacids, polyesters, anhydrides of acids, polyepoxides, and combinations thereof.

7. A method according to claim 4 wherein said crosslinking agent is selected from the group consisting of phenols, resorcinols, fluoroglucinols, aromatic amines, aliphatic amines, pyrroles, indoles, nitrates, esters, ketones, nitriles, and combinations thereof.

8. A method according to claim 4 wherein said hydroxymethylated polyamide ligand is derived from a member selected from the group consisting of ethylene bis (oxyethylenenitrilo)tetraacetic acid (EGTAM), diaza-18-crown-6-tetraamide, ethylenediaminetetraacetamide-N-methylenepropanetetraamine (EDTAAMT), tris(2-aminoethyl)amine pentaamide (TRENPAM), diethylenetriaminepentaacetamide (DTPAM), and combinations thereof.

9. A method according to claim 8 wherein said hydroxymethylated polyamide ligand is derived from ethylene bis (oxyethylenenitrilo)tetraacetic acid (EGTAM).

10. A method according to claim 8 wherein said hydroxymethylated polyamide ligand is derived from diaza-18-crown-6-tetraamide.

11. A method according to claim 8 wherein said hydroxymethylated polyamide ligand is derived from ethylenediaminetetraacetamide-N-methylenepropanetetraamine (EDTAAMT).

12. A method according to claim 8 wherein said hydroxymethylated polyamide ligand is derived from tris(2-aminoethyl)amine pentaamide (TRENPAM).

13. A method according to claim 8 wherein said hydroxymethylated polyamide ligand is derived from diethylenetriaminepentaacetamide (DTPAM).

14. A method according to claim 4 wherein said selected ion is a member selected from the group consisting of transition ions, post-transition ions, alkaline earth metal ions, and combinations thereof.

15. A method according to claim 14 wherein said selected ion is one or more transition metal ions.

16. A method according to claim 15 wherein said transition metal ion is selected from the group consisting of $Cd^{2+}$, $Ag^+$, $Ni^{2+}$, $Co^{2+}$, $Fe^{3+}$, $Cu^{2+}$, $Sr^{2+}$, $Ca^{2+}$, and combinations thereof.

17. A method according to claim 16 wherein said transition metal ion is $Cd^{2+}$.

18. A method according to claim 14 wherein said selected ion is one or more post-transition metal ions.

19. A method according to claim 18 wherein said post-transition metal ion is $Pb^{2+}$.

20. A method according to claim 14 wherein said selected ion is one or more alkaline earth metal ions.

21. A method according to claim 20 wherein said alkaline earth metal ion is selected from the group consisting of $Ca^{2+}$, $Sr^{2+}$, and combinations thereof.

* * * * *